(12) United States Patent
Poole Siguero et al.

(10) Patent No.: US 12,177,352 B2
(45) Date of Patent: Dec. 24, 2024

(54) SYSTEMS AND METHODS FOR STATELESS AUTHENTICATION AND AUTHORIZATION USING JWT ACCESS TOKENS

(71) Applicant: Open Text Corporation, Waterloo (CA)

(72) Inventors: Conrado Eduardo Poole Siguero, San Francisco, CA (US); Sandip Chitale, Pleasanton, CA (US); Derek Zasiewski, Oakville (CA)

(73) Assignee: OPEN TEXT CORPORATION, Waterloo (CA)

( * ) Notice: Subject to any disclaimer, the term of this patent is extended or adjusted under 35 U.S.C. 154(b) by 117 days.

(21) Appl. No.: 17/829,237

(22) Filed: May 31, 2022

(65) Prior Publication Data

US 2023/0388119 A1  Nov. 30, 2023

(51) Int. Cl.
*H04L 9/32* (2006.01)
*H04L 67/02* (2022.01)
*H04L 67/146* (2022.01)
*H04L 69/22* (2022.01)

(52) U.S. Cl.
CPC .......... *H04L 9/3213* (2013.01); *H04L 9/3247* (2013.01); *H04L 67/02* (2013.01); *H04L 67/146* (2013.01); *H04L 69/22* (2013.01)

(58) Field of Classification Search
CPC ..... H04L 9/3213; H04L 67/02; H04L 9/3247; H04L 69/22; H04L 67/146
See application file for complete search history.

(56) References Cited

U.S. PATENT DOCUMENTS

| | | | |
|---|---|---|---|
| 10,348,713 B2 | 7/2019 | Thakkar | |
| 10,728,245 B2* | 7/2020 | Kiester | H04L 9/3213 |
| 11,121,863 B1* | 9/2021 | O'Neill | H04L 9/0894 |
| 11,233,802 B1* | 1/2022 | Rudeanu | H04L 63/0435 |
| 2016/0012521 A1* | 1/2016 | Carlucci | G06Q 30/08 |
| | | | 705/5 |
| 2016/0259936 A1 | 9/2016 | Mukherjee | |
| 2017/0169100 A1* | 6/2017 | Reshadi | G06F 21/54 |

(Continued)

OTHER PUBLICATIONS

Zheng, et al., "Cookies Lack Integrity: Real-World Implications", Aug. 2015, USENIX Association, 24th USENIX Security Symposium (USENIX Security 15), pp. 707-721 (Year: 2015).*

(Continued)

*Primary Examiner* — Jonathan A Bui (57) ABSTRACT

Systems and methods for secure stateless client-server communication. User credentials in a client authorization request are authenticated and used to generate a JSON web token (JWT). The JWT header and signature are encrypted and included in an HTTP-only cookie. The JWT payload is encrypted and sent to the client in a response body along with the HTTP-only cookie. Each subsequent client request includes the cookie and has the encrypted JWT payload in the request header. Upon receiving the request, the server decrypts the encrypted JWT payload from the header and decrypts the encrypted JWT header and signature from the cookie, then reconstructs the JWT from the JWT header, payload and signature. The server validates the JWT and, if valid, processes the request according to authorizations in the JWT payload.

20 Claims, 8 Drawing Sheets

(56) References Cited

U.S. PATENT DOCUMENTS

| | | | |
|---|---|---|---|
| 2018/0075231 A1 | 3/2018 | Subramanian | |
| 2019/0182250 A1* | 6/2019 | Kiester | H04L 63/0428 |
| 2019/0354709 A1* | 11/2019 | Brinskelle | G06F 21/31 |
| 2020/0162583 A1* | 5/2020 | Burckhardt | H04L 63/08 |
| 2020/0213297 A1 | 7/2020 | Suraparaju | |
| 2022/0182372 A1* | 6/2022 | Russo | G06F 16/958 |
| 2022/0286440 A1 | 9/2022 | Gerrie | |
| 2023/0129631 A1 | 4/2023 | Khan | |
| 2023/0171240 A1* | 6/2023 | Hulick, Jr. | H04L 9/3263 |
| | | | 726/6 |
| 2023/0403262 A1 | 12/2023 | Poole Siguero | |

OTHER PUBLICATIONS

Li, et al., "JWT-Based Client Authentication Method and System" (English WIPO translation), Sep. 29, 2021, CN114124441, p. 1 (Year: 2021).*

Notice of Allowance for U.S. Appl. No. 17/829,238, mailed May 2, 2024, 6 pgs.

* cited by examiner

SYSTEMS AND METHODS FOR STATELESS AUTHENTICATION AND AUTHORIZATION USING JWT ACCESS TOKENS

TECHNICAL FIELD

The invention relates generally to network-based communications between a client and a server, and more particularly to systems, methods and products for ensuring the security of communications between a client and a server using components of a JSON web token which are incorporated into a HTTP-only secure cookie and an access token which are included in communications to enable secure, stateless authentication of the client to the server.

BACKGROUND

Software is often organized to run on distributed systems (multiple computing devices interconnected by a network) by implementing a client-server model. In a client-server model, a client application is executed on a first, client device, and a server application is executed on a second, server device. The server application/device provides services that are used by the client application/device.

It is desirable for communications between networked client and server devices to be secured, so that the services provided by the server can be obtained only by client devices that are authorized to receive the services. It is therefore necessary to ensure proper authentication and/or authorization of the client to obtain the services.

In some systems, the authentication of the client is performed using stateful techniques. In other words, the authentication of the client is dependent upon the stateful communications between the client and server. State information is commonly maintained by the server, so communications with a particular client must be performed by a corresponding server instance that maintains this state information. It may, however, be desirable for the system to use stateless authentication so that the client may securely communicate with multiple, different server instances.

In order to implement stateless authentication, every communication from the client to the server must Include enough information that the server instance receiving the communication can authenticate the client and provide the requested services. Stateless authentication can be implemented in some systems using JSON Web Tokens (JWTs). JWTs normally include a header, a payload and a signature. JWTs are generated by the server and provided by the server to the client so that the client can include the JWTs in their service requests, and the requests can then be authenticated by the server using the JWTs.

One of the problems with using JWTs for authentication arises when a JWT is stored in a cookie because the cookie may have limitations as to the amount of information that it can contain. Normally, the payload of the JWT includes information such as the users, roles and groups associated with the request. In many instances, the information that needs to be included in the JWT payload is very large, so the JWT can become quite large. Because a cookie has a limited size, the cookie may not be able to contain a JWT if it has a very large payload, causing the JWT to exceed the size limit of the cookie.

It would therefore be desirable to provide techniques for authenticating and authorizing requests from clients to servers which reduce more eliminate one or more of these problems.

SUMMARY

Embodiments disclosed herein address one or more of the problems described above by generating the components of a JWT responsive to a client request, and then providing the portion of the JWT components to the requesting client in an HTTP-only cookie, while the remainder of the components are provided in an encrypted payload. The client can then include the HTTP-only cookie and the encrypted payload with subsequent requests to the server, and the server can use the cookie and the encrypted payload to reconstitute or reconstruct the JWT and authenticate the request using the reconstructed JWT.

One embodiment comprises a method for secure stateless communication. This method is implemented at a server and includes receiving a request from a browser for authentication of user credentials and generating components of a JSON web token (i.e., a JWT header, a JWT payload and a JWT signature. The request from the browser may be received via a secure communication channel (e.g., uses HTTPS protocol). The server generates a secure HTTP-only cookie that contains an encrypted version of the JWT header plus JWT signature, and also generates an encrypted version of the JWT payload. If the communication channel is secure, the Secure flag is also set on the Cookie. The server returns a response to the browser responsive to the request, the response including in the body of the response the encrypted version of the JWT payload as an access token. The response is sent to the browser with the secure HTTP-only cookie.

For each subsequent communication received from the browser, the server performs a series of actions including extracting the HTTP-only cookie and a request header from the request, decrypting the HTTP-only cookie to obtain the JWT header plus JWT signature, and decrypting the header to obtain the JWT payload of the access token. The server then reconstitutes the JSON web token from the JWT header, the JWT payload and the JWT signature and verifies the JSON web token. If the JSON web token is verified, the server processes the request and returns a corresponding response to the browser. If the JSON web token is not verified, the server denies access and returns a corresponding error message to the browser.

In some embodiments, the method further comprises extracting the encrypted version of the JWT header plus JWT signature from the HTTP-only cookie and decrypting the encrypted version of the JWT header plus JWT signature to obtain the JWT header plus JWT signature. The method may also include extracting the encrypted version of the access token from the header and decrypting the encrypted version of the access token to obtain the JWT payload.

In some embodiments, reconstituting the JSON web token from the HTTP-only cookie and the request header comprises decrypting the HTTP-only cookie and the request header to obtain the JWT header, the JWT signature and the JWT payload, wherein the JWT payload comprises the access token, and combining the JWT header, the JWT signature and the JWT payload to form the JSON web token.

In some embodiments, the combined size of the JWT header, the JWT signature and the JWT payload is greater than an allowable size of the HTTP-only cookie.

In some embodiments, processing the request comprises extracting authorization information from the JWT payload and enabling access to the server in accordance with the extracted authorization information.

In some embodiments, the method includes, in response to receiving a logout request containing the valid JSON web token, expiring the HTTP-only cookie and returning the expired HTTP-only cookie to the browser.

An alternative embodiment comprises a method for secure stateless communication by a client and server over a network. This method includes transmitting, by the browser on a client device, an authentication request containing user credentials to a server over the network. The server authenticates the user credentials and generates, in response to authentication of the credentials, components of a JSON web token including a JWT header, a JWT payload comprising an access token and a JWT signature. The server generates an HTTP-only cookie containing an encrypted version of the JWT header plus JWT signature and an encrypted version of the JWT payload. The server transmits a response to the request, where the body of the response contains the encrypted version of the JWT payload as an access token and is sent with the HTTP-only cookie.

The method also includes transmitting, by the browser, one or more subsequent requests to the server, each of the one or more subsequent requests including the HTTP-only cookie and a header containing the encrypted version of the access token. The server processes each of the subsequent requests by decrypting the HTTP-only cookie and the header to obtain the JWT header, the JWT signature, and decrypting the access token to obtain the JWT payload. The server then reconstitutes the JSON web token from these components and verifies the JSON web token. If the JSON web token is verified, the server processes the request and returns a corresponding response to the browser. If the JSON web token is not verified, the server denies access to the server and returns a corresponding error message to the browser.

In some embodiments, the method further includes extracting, by the server, the encrypted version of the JWT header plus JWT signature from the HTTP-only cookie and decrypting the encrypted version of the JWT header plus JWT signature to obtain the JWT header plus JWT signature. The method may also include the server extracting the encrypted version of the JWT payload of the access token from the header and decrypting the encrypted version of the JWT payload to obtain the JWT payload.

In some embodiments, reconstituting the JSON web token from the HTTP-only cookie and the request header comprises decrypting the HTTP-only cookie and the request header to obtain the JWT header, the JWT signature and the JWT payload, wherein the JWT payload comprises the access token, and combining the JWT header, the JWT signature and the JWT payload to form the JSON web token. In some embodiments, the combined size of the JWT header, the JWT signature and the JWT payload is greater than an allowable size of the HTTP-only cookie. The HTTP-only cookie may be inaccessible by Java scripts on the browser.

In some embodiments, processing the subsequent requests comprises extracting authorization information from the JWT payload and enabling access to the server in accordance with the extracted authorization information.

In some embodiments, the method includes, in response to receiving a logout request containing the valid JSON web token, expiring the HTTP-only cookie and returning the expired HTTP-only cookie.

Another alternative embodiment comprises a method implemented in a browser for secure stateless communication. This method includes transmitting a request for authentication of user credentials to a server and receiving a response to the request for authentication. The body of the response includes an access token that contains an encrypted version of the JWT payload, and the response is sent with an HTTP-only cookie. The size of the encrypted access token in combination with the HTTP-only cookie is greater than an allowable size of the HTTP-only cookie. The browser then transmits one or more subsequent requests to the server, where each of the subsequent requests includes the HTTP-only cookie and a header, where the header contains the encrypted version of the access token. The HTTP-only cookie may be inaccessible by Java scripts on the browser.

In some embodiments, the method further includes the browser transmitting, after the one or more subsequent requests to the server, a logout request to the server, the logout request including the HTTP-only cookie and a header, and in response to receiving an expired version of the HTTP-only cookie, forgetting the HTTP-only cookie at the browser. Forgetting the HTTP-only cookie at the browser may comprise invalidating the HTTP-only cookie or deleting the HTTP-only cookie from a storage associated with the browser.

The disclosed embodiments may provide a number of advantages over existing techniques. For example, these embodiments may provide stateless authentication between a client and any of a number of different server instances, providing secure access to the server instances while using authentication slash authorization information that exceeds so is limits for information that may be contained in an HTTP-only cookie. The use of an HTTP-only cookie in combination with an encrypted payload to carry the information of the JWT allows the client to carry on secure communications without exposing the authentication slash authorization information to cross site scripting (XSS) and cross site request forgery (CSRF) attacks. Other benefits may also be apparent to those skilled in the art of the invention.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein include systems, methods and products for enabling stateless authentication of requests from clients to servers. In these embodiments, components of a JWT token are used in a novel way to enable authentication of requests based on client information that is too large to be contained in a cookie, as is the case in conventional JWT authentication techniques.

Generally speaking, the present techniques involve a server generating components of a JWT token (i.e., a header, a payload, and a signature) responsive to an authentication request. The server provides a response to the authentication request which includes: an HTTP-only secure cookie containing the encrypted header and signature components of the JWT; and a response body containing an encrypted payload as an access token. Then, when the client sends a request for service to the server, the client includes the HTTP-only cookie with the request and also includes the encrypted payload in the request header. Upon receiving the request for service, the server decrypts the HTTP only cookie to obtain the JWT header and signature, decrypts the encrypted payload to obtain the JWT payload, and reconstructs the JWT using these components (i.e., the JWT header, JWT payload and JWT signature). The reconstructed JWT is then used by the server to authenticate the request.

The HTTP-only cookie mechanism is used to prevent JavaScript running inside the browser from accessing the information that is contained in the cookie. If a conventional cookie is stored in session and local storage, it is normally readable to any script that happens to run in the context of the same browser page. This type of cookie is vulnerable to cross-site scripting (XSS) attacks because a script can read the token and send it elsewhere. A cross-site request forgery (CSRF) attack can occur in an authenticated session when the server trusts the user/browser (XSS attacks don't need an authenticated session) and can be exploited when the vulnerable website doesn't do the basics of validating or escaping input. The HTTP-only mechanism prevents JavaScript running inside the browser from accessing the cookies, but the HTTP-only cookies are automatically sent by the browser if the domain of the request matches the domain in the path set in the cookie.

Even if the HTTP-only cookie could be accessed somehow, it is still not sufficient to authenticate a request by itself because it only contains the header and signature of the JWT. There are websites that can try to read a token and identify what is in the token, the token used here is not in a form that is compliant with conventional specifications, so it will be gibberish. In the present embodiments, it is necessary to also have the JWT payload in order to be able to reconstitute the JWT so that the signature of the JWT can be authenticated. Thus, in the present embodiments, the encrypted JWT payload must be included in the header of the request so that it can be extracted, decrypted and used to reconstruct the JWT.

Figure 1:
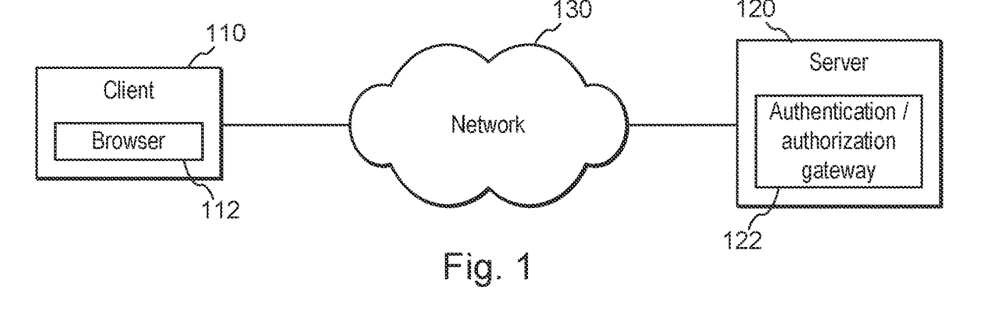
FIG. 1 is a block diagram illustrating, at a high level, the structure of a client-server model in accordance with some embodiments.

Some embodiments of the invention may be implemented in a distributed system as depicted in FIG. 1. This figure Is a simple block diagram illustrating, at a high level, the structure of a client-server model. In this model, a client device 110 and a server device 120 are each connected to a network 130 such as the Internet. Server 120 provides services that are used by client 110. Client device 110 may have a client application executing thereon, and the client application may, for example, use a browser 112 to access the services of server 120 via an authentication and authorization gateway 122.

Browser 112 initially transmits an authentication request to gateway 122. Gateway 122 verifies the validity of the user credentials provided in the authentication request and returns a cookie and an encrypted payload to browser 112. subsequently, when browser 112 requests services from server 120, the cookie and encrypted payload are included in the request so that authentication and authorization gateway 122 can verify the request and responsively provide the requested services. When the user has completed the session with server 120, a logout request is transmitted from browser 112 to gateway 122, and the gateway returns an expired cookie. Upon receiving the expired cookie, browser 112 forgets the cookie, and subsequent communications between the client and the server would require re-authentication. "Forget" is used here to refer to the browser either deleting the cookie from memory or invalidating the cookie so that it can no longer be used in subsequent requests.

Figure 2:
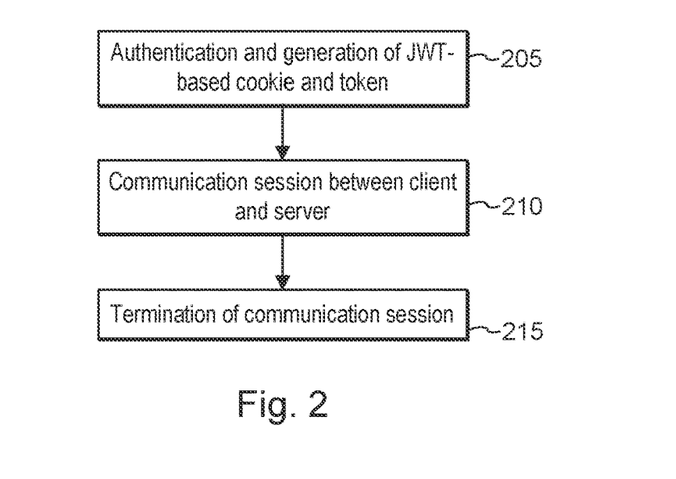
FIG. 2 is a simple flow diagram illustrating the phases of a method in accordance with some embodiments.

Referring to FIG. 2, a simple flow diagram illustrating the phases of a method in accordance with some embodiments is shown. As depicted in this figure, the first phase (205) of the method is the authentication of a user and the generation of a JWT-based cookie and token. The authentication of the user is performed in response to an authentication request from the user, and the JWT-based cookie and token are provided to the user in response to the authentication request.

The second phase (210) of the method comprises a communication session between a client device and a server. During this phase, the user initiates requests for service through a browser on the client device, where each request includes the JWT based cookie and token, and the server authenticates the request using the cookie and token and then returns a response to the request if the cookie and token are valid. The communication session may comprise one or more requests and corresponding responses.

The third phase (215) of the method comprises the conclusion or termination of the communication session. In this phase, the user sends a logout request from the browser to the server, the logout request including the JWT based cookie and token, and the server returns the expired cookie. Upon receiving the expired cookie, the browser "forgets" the cookie so that no further requests containing the cookie can be made.

Figure 3:
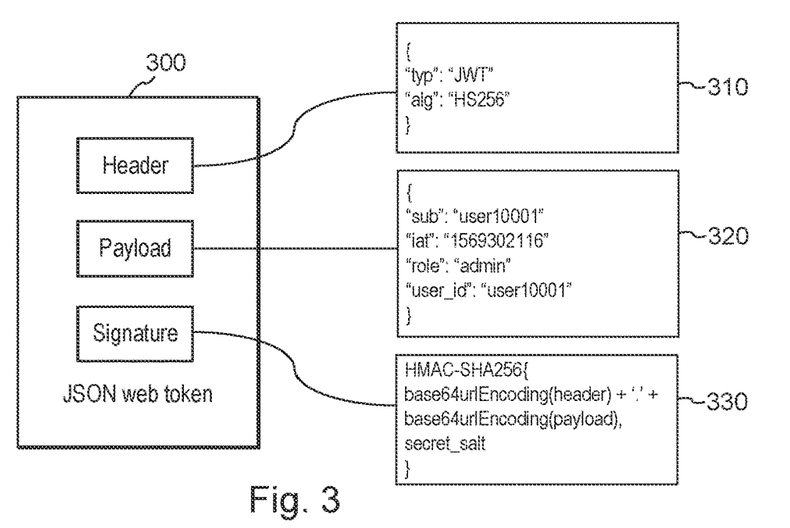
FIG. 3 is a diagram illustrating the components of a JWT.

Referring to FIG. 3, a diagram illustrating the components of a JWT is shown. The JWT 300 includes a header 310, a payload 320 and a signature 330. Header 310 includes information identifying the type of token ("JWT") and the algorithm used to generate the signature, which in this example is "HS256". Payload 320 includes information about the user for authentication and/or authorization (e.g., users, roles, groups, etc.). Signature 330 is generated using the algorithm identified in the header, applied to the encoding of the header and the encoding of the payload.

Figure 4A:
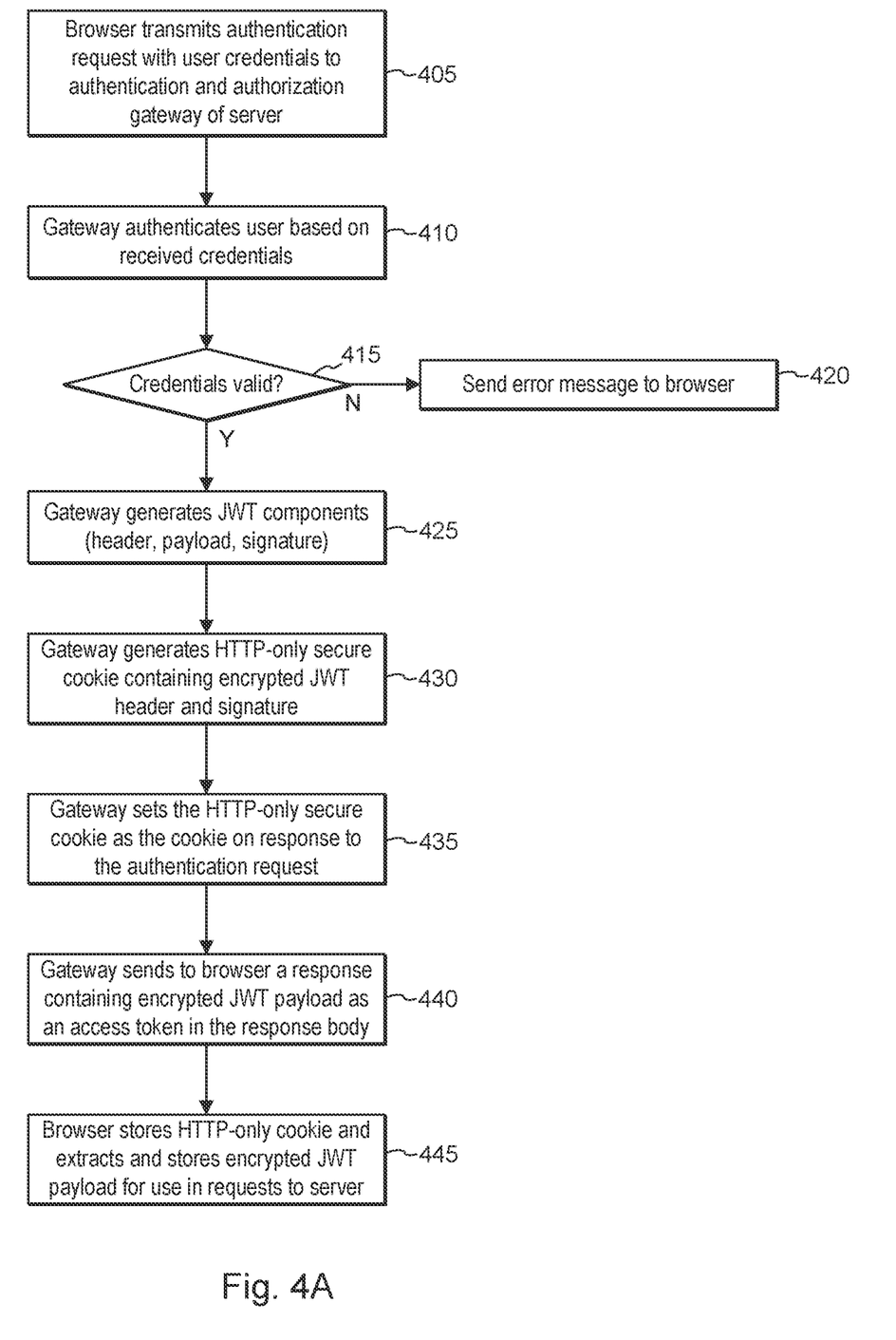
FIG. 4A is a flow diagram illustrating a process of requesting authentication and the server generating the JWT-based HTTP-only cookie and token in accordance with some embodiments.
Figure 4B:
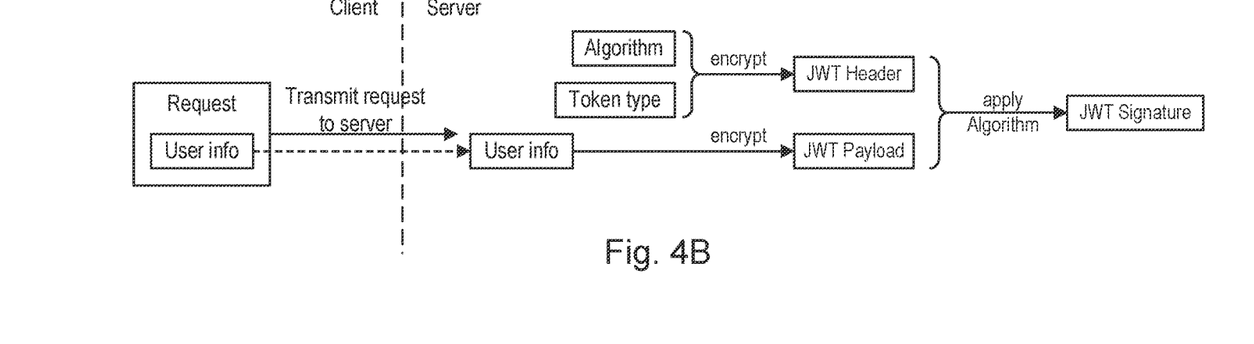
FIG. 4B is a diagram illustrating how the user information in the authentication request is used to generate the components of the JWT in accordance with some embodiments.
Figure 4C:
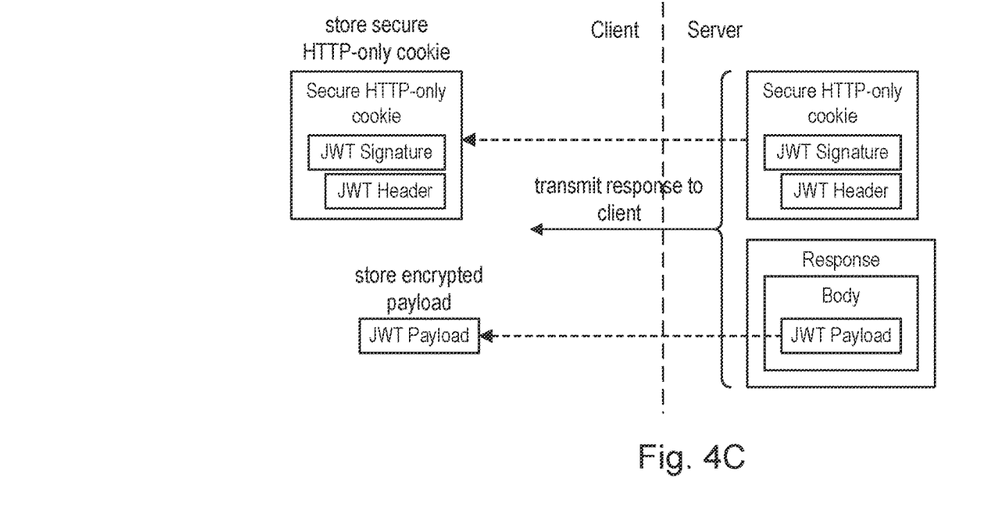
FIG. 4C is a diagram illustrating how the components of the JWT are included in the secure HTTP-only cookie and response to the client in accordance with some embodiments.

The phases of the method shown in FIG. 2 are explained in greater detail in connection with FIGS. 4A-6. FIGS. 4A-4C correspond to the first phase (205), FIG. 5 corresponds to the second phase (210) and FIG. 6 corresponds to the third phase (215).

Referring to FIG. 4A, a flow diagram is shown to illustrate in more detail the process of the user requesting authentication and the server generating the JWT-based HTTP-only cookie and token. At step 405, a user initiates communications with the server by, for example, logging in to the server. This causes the browser to transmit an authentication request to the authentication gateway of the server. The authentication request includes credentials for the user. When the authentication gateway receives the authentication request from the browser, it extracts the user credentials and authenticates the credentials (step 410). If the credentials are invalid (step 415), the gateway returns an error message to the browser (e.g., HTTP error status 401) (step 420).

If the user credentials received in the authentication request are valid, the authentication gateway generates the components of a JWT (step 425). These components include a header, a payload and a signature.

After the JWT components have been generated, the authentication gateway generates in HTTP-only secure cookie. The HTTP-only cookie contains an encrypted version of the JWT header and the JWT signature (step 430). As noted above, the JWT payload may include a great deal of information, and this information (in combination with the JWT header and signature) may exceed the size limits for the cookie, so the JWT payload is not contained in the cookie. The authentication gateway then sets the generated HTTP-only cookie as the cookie for the response to the browser's authentication request (step 435).

The authentication gateway then generates a response to the authentication request and sends the response to the browser in reply to the authentication request (step 440). The JWT payload is encrypted, and this encrypted payload is included by the authorization gateway in the header of the response to the authorization request. The encrypted JWT payload is identified by the authentication gateway as an access token. The authentication gateway sends the HTTP-only cookie containing the encrypted JWT header and JWT signature to the browser with the response to the authentication request.

When the browser receives the response to the authentication request, it stores the HTTP only cookie and extracts the encrypted JWT payload, storing the encrypted payload so that it can be included as a token in the headers of requests that are subsequently sent from the browser to the server (step 445).

FIGS. 4B and 4C provide a more graphical illustration of how the components of the JWT are generated and used in the first phase of FIG. 2. FIG. 4B shows how the user information in the authentication request is used to generate the components of the JWT. FIG. 4C shows how the components of the JWT are included in the secure HTTP-only cookie and response to the client.

Referring to FIG. 4B, the request containing the user information is transmitted from the client to the server. When the server receives the request, it extracts the user information from the request. The server already has the information identifying the algorithm to be used to generate the JWT components, and knows that the algorithm will be used to generate a JWT-type token. The algorithm and token type are combined (e.g., after being encoded with base64URLencoding) and encrypted to form the JWT header. The user information received from the client is also encoded (using base64URLencoding) encrypted to form the JWT payload. The JWT header and JWT payload are then signed using the algorithm to form the JWT signature. The server then has all three components of the JWT (JWT header, JWT payload and JWT signature).

Referring to FIG. 4C, the server generates a secure HTTP-only cookie that contains the JWT signature and JWT header formed as shown in FIG. 4B. The server also generates a response to the client's request, where the body of the response contains the encrypted payload. The server then sends the response, along with the secure HTTP-only cookie to the client. When the client receives the response, it stores the secure HTTP-only cookie, and also stores the encrypted JWT payload.

Figure 5A:
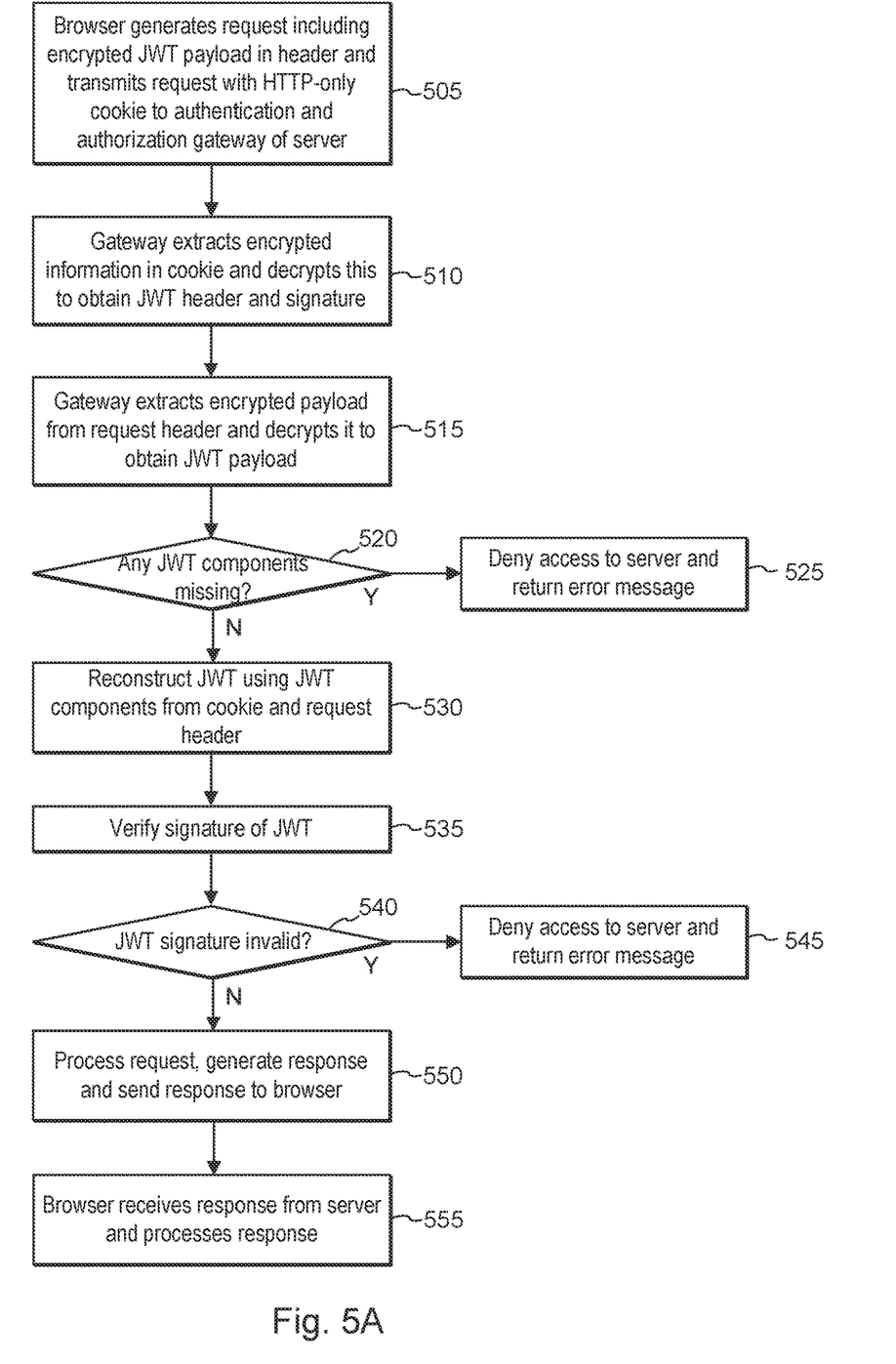
FIG. 5A is a flow diagram illustrating a process of communicating between a client and server in accordance with some embodiments.

Referring to FIG. 5A, a flow diagram is shown to illustrate in more detail the process of communicating between a client and server in accordance with some embodiments. The depicted process represents a single communication cycle in which the client transmits a request for service to the server, and the server processes the request and sends a communication to the client which is responsive to the request. This process is repeated for each request/response between the client and server. The communications depicted in this figure make use of the HTTP-only cookie and encrypted JWT payload as described above in connection with FIG. 3.

At step 505, the browser generates a request for services which will be sent to the server. The header of the request contains the encrypted payload. The HTTP-only cookie which was previously received from the authentication gateway is transmitted with the request. When the request for service is received by the authentication gateway of the server, the gateway extracts the encrypted header and signature from the cookie and decrypts them to obtain the original JWT header and JWT signature (step 510). The authentication gateway also extracts the encrypted JWT payload from the request header and decrypts it to obtain the original JWT payload (step 515).

If the authentication gateway cannot obtain any of these JWT components (step 520), the gateway denies the requested access to the server and returns an error message to the browser in response to its request (step 525). if the authentication gateway is able to obtain the JWT header, JWT payload and JWT signature from the browser's request, these components are then used to reconstruct the original JWT step 530). Using the reconstructed JWT, the authentication gateway determines whether the JWT signature is valid (step 535). Since the JWT signature was originally generated based on the JWT header and JWT payload, validation of the JWT comprises substantially the same process. In other words, a signature is generated based on the recovered JWT header and JWT payload, and this newly generated signature is compared to the JWT signature. If the newly generated signature matches the original JWT signature, the JWT is valid.

If the JWT signature is determined to be invalid (step 540), the gateway denies access to the server and returns a corresponding error message to the browser (step 545). If the JWT signature is determined to be valid (step 540), the server processes the request, generates a response to the request and returns this response to the browser (step 550). Processing the request may include, for example, examine the JWT payload to determine authorization information that is contained in the payload such as users, roles and groups and the like, and then enforce applicable rules to enable access to the server in accordance with the authorization information in the JWT payload.

When the browser receives the response, it processes the corresponding information (step 555), and the communication cycle corresponding to the browser's request is complete.

Figure 5B:
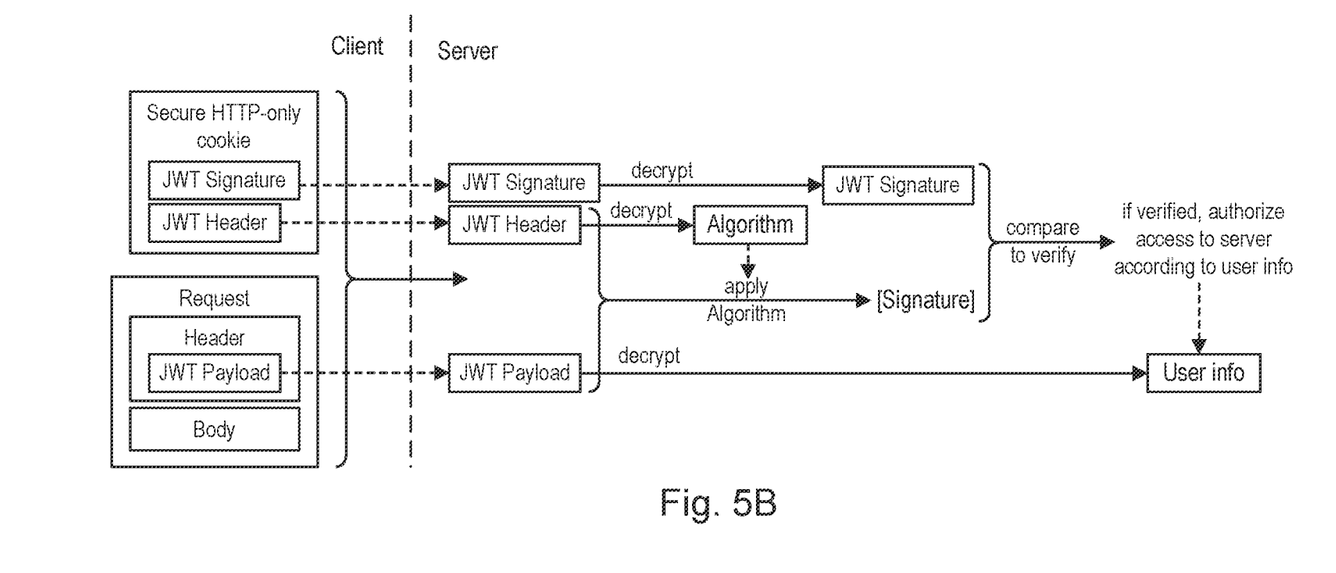
FIG. 5B is a diagram illustrating how the system uses the secure HTTP-only cookie and the encrypted JWT payload for authentication of client requests by the server in accordance with some embodiments.

FIG. 5B provides a more graphical illustration of how the system uses the secure HTTP-only cookie and the encrypted JWT payload for authentication of client requests by the server. In this phase, the client generates a request that includes a header and a body. The request header contains the encrypted JWT payload which was previously stored by the client. When the request is transmitted from the client to the server, it is sent with the previously stored secure HTTP-only cookie that contains the encrypted JWT signature and JWT header. When the request is received by the server, the server extracts the encrypted JWT signature and JWT header from the secure HTTP-only cookie and decrypts them. The algorithm in the JWT header is identified, and is used to generate a signature corresponding to the JWT header plus JWT payload. This generated signature is compared to the JWT signature that was contained in the secure HTTP-only cookie to verify that the components of the JWT have not been tampered with. If the generated signature matches the extracted JWT signature, the signature is verified, and the request is authenticated, so access to the server is allowed in accordance with the user information that is contained in the JWT payload. The server then generates a response to the request and returns the response with the secure HTTP-only cookie (not shown in the figure).

Figure 6:
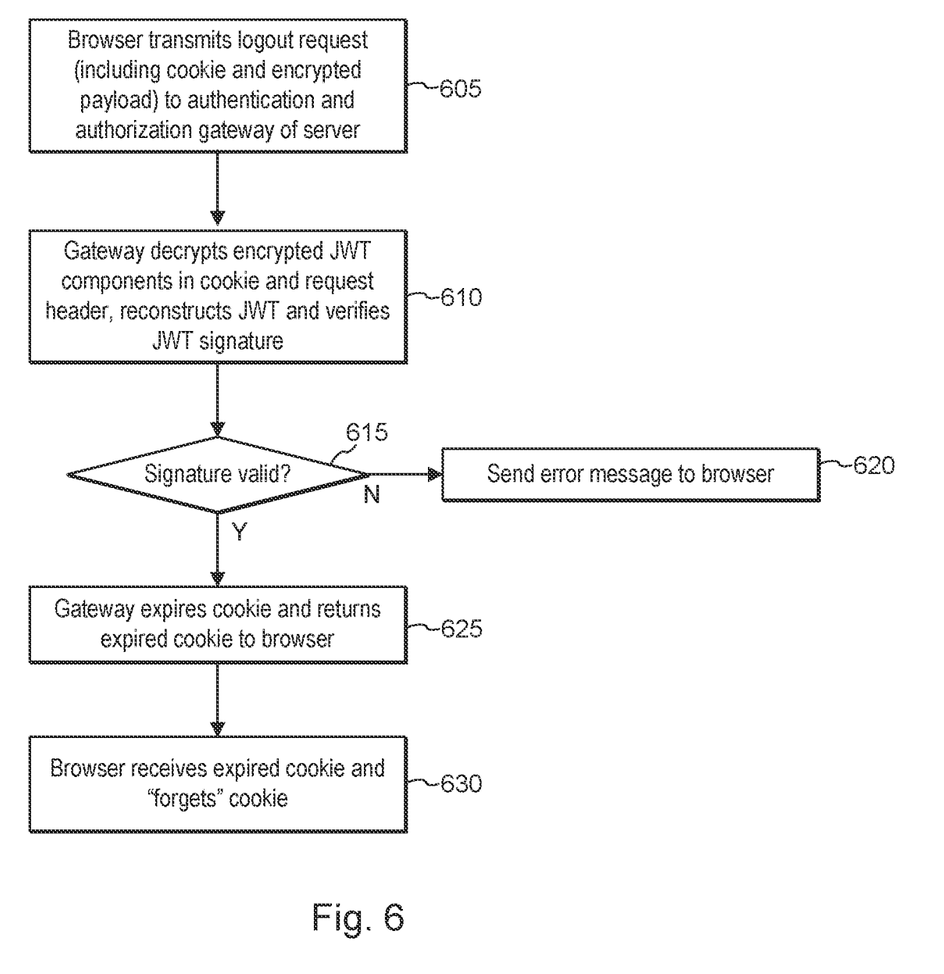
FIG. 6 is a flow diagram illustrating a process of terminating the communication session between the client and the server in accordance with some embodiments.

Referring to FIG. 6, a flow diagram is shown to illustrate in more detail the process of terminating the communication session between the client and the server in accordance with some embodiments. As depicted in this figure, the process begins with the browser generating a logout request that is transmitted to the authentication gateway (step 605). The request is generated in the same way as any other request and includes the encrypted JWT payload as an access token in the header of the request. The request also includes the cookie with the encrypted JWT header and JWT signature.

When the authentication gateway of the server receives the request, it decrypts the JWT header and JWT signature from the cookie, decrypts the encrypted JWT payload extracted from the header of the request, reconstruct the JWT from these decrypted components, and then verifies the JWT signature of the reconstructed JWT (Step 610).

If the JWT signature is invalid (step 615), an error message is returned to the browser (step 620) and the request is discarded. Thus, the logout request is not processed, and the communication session is not terminated. If the JWT signature is valid (step 615), the logout request is processed, with the authentication gateway expiring the cookie and returning the expired cookie to the browser (step 625). When the browser receives the expired cookie, the browser "forgets" the cookie (i.e., deletes the cookie from storage or invalidates the cookie so that it can no longer be used to generate valid requests to the server) (step 630). This terminates the communication session.

Figure 7:
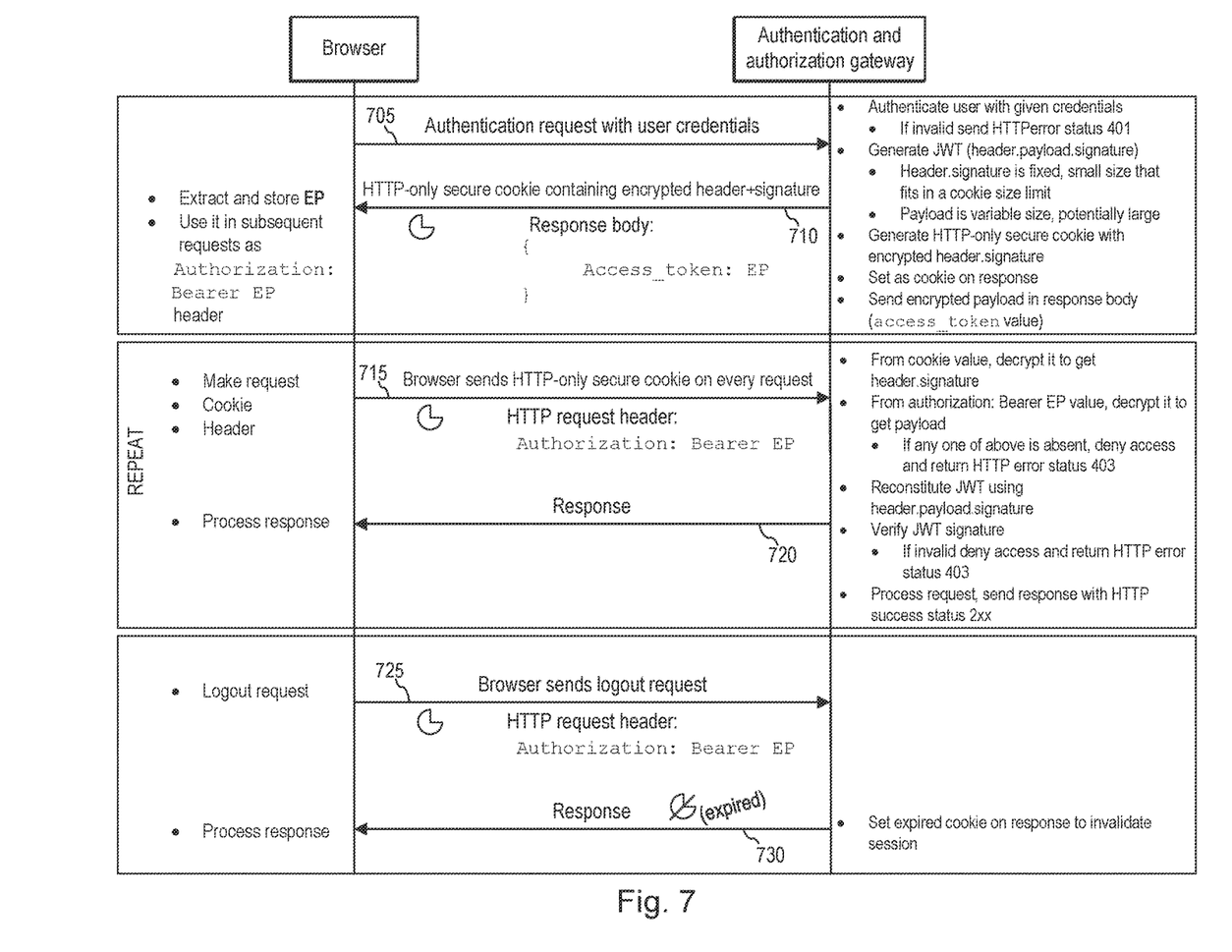
FIG. 7 is a transactional diagram summarizing the transactions described above with respect to the communications between the client and server in some embodiments.

Referring to FIG. 7, a transactional diagram is shown summarizing the transactions described above with respect to the communications between the client and server in some embodiments. As shown in this figure, the browser initially transmits an authentication request 705 with a set of user credentials to the authentication and authorization gateway. After authenticating the user credentials and generating the JWT components corresponding to the authentication request, the gateway transmits a response 710 to the browser, where the body of the response includes an access token comprising the encrypted JWT payload ("EP" in the figure). The response is transmitted with a secure HTTP-only cookie that includes the encrypted JWT header and JWT signature.

The browser then sends a request 715 to the authentication and authorization gateway, where the request includes the encrypted JWT payload as a token in its header. The request is sent with the HTTP-only cookie that was received from the authentication gateway. After decrypting the cookie and header information to obtain the JWT components (header, payload and signature), the gateway reconstructs the JWT and verifies the JWT signature, and then returns a response 720 to the browser. As noted above, request 715 and response 720 may be repeated as many times as is necessary for the browser to obtain the desired service(s) from the server.

After the browser has obtained the desired service(s) and is ready to terminate the communication session, a logout request 725 is sent by the browser to the authentication and authorization gateway. After the gateway has authenticated the request and expired the cookie, it sends a response 730 to the browser which includes the expired cookie, causing the browser to forget the cookie. It will therefore be necessary for the browser to repeat the process of sending an authentication request and receiving a corresponding secure HTTP-only cookie and token (encrypted JWT payload) before it can obtain further services from the server.

It should be noted that there may be numerous alternative embodiments of the present invention. These embodiments may include various systems, methods and products. Alternative embodiments may include, for example, a method for stateless processing over a network that includes generating a token at a server, where the token comprises a token header, a token signature, and a token payload. A cookie is then generated, the cookie comprising the token header and the token signature. A token response is sent to a client device, the token response comprising the cookie and the token payload, where the token payload is sent in the token response body. An application request is generated at the client device, the request comprising the cookie and an application request header, the application request header comprising the token payload. The server then regenerates the token, including processing the cookie to regenerate the token header and the token signature of the token; and processing the application request header to regenerate the token payload. The token is then verified and the application request is processed to generate an application response. The application response is then sent to the client device.

In some embodiments, the token is a JSON web token. In some embodiments, the cookie is a Hypertext Transfer Protocol (HTTP)-only cookie. In some embodiments, the cookie is encrypted when sent and is decrypted at the client device. In some embodiments, the token payload is encrypted and comprises an access token, where the token payload is decrypted at the client device.

In some embodiments, the server comprises a plurality of servers, and generating the token is performed at one of the plurality of servers in response to receiving from the client device an authentication request comprising credentials, the one server verifying the credentials and the token generated as part of stateless processing over the network between the client device and the plurality of servers.

In some embodiments, the method further comprises receiving from the client a logout request comprising the cookie, and in response, at the server, expiring the cookie to invalidate a stateless session.

In another alternative embodiment, a system for stateless processing over a network comprises a processor and a memory which is coupled to the processor. The memory contains computer executable instructions that, when executed by the processor, perform a method that includes generating a token at a server, the token comprising a token header, a token signature, and a token payload. The method also includes generating a cookie comprising the token header and the token signature, and sending a token response to a client device, the token response comprising the cookie and the token payload, the token payload sent in the token response body. An application request is generated at the client device, the application request comprising the cookie and an application request header, the application request header comprising the token payload. The token is regenerated at the server by processing the cookie to regenerate the token header and the token signature of the token and processing the application request header to regenerate the token payload. The token is then verified and the application request is processed to generate an application response. The application response is then sent to the client device.

In some embodiments, the token is a JSON web token. The cookie may be a Hypertext Transfer Protocol (HTTP)-only cookie. The cookie may be encrypted when transmitted and then decrypted at the client device.

In some embodiments, the token payload is encrypted and comprises an access token, where the token payload is decrypted at the client device.

In some embodiments, the server comprises a plurality of servers, and generating the token is performed at one of the plurality of servers in response to receiving from the client device an authentication request comprising credentials, the one server verifying the credentials and the token generated as part of stateless processing over the network between the client device and the plurality of servers.

In some embodiments, the method embodied by the instructions further comprises receiving from the client a logout request comprising the cookie, and in response, expiring the cookie to invalidate a stateless session.

Another alternative embodiment comprises a computer program product including a non-transitory computer readable medium storing instructions executable by a processor to perform a method for stateless processing over a network. The method includes generating a token at a server comprising a token header, a token signature, and a token payload. The method further includes generating a cookie comprising the token header and the token signature. A token response is then sent to a client device, the token response comprising the cookie and the token payload, the token payload sent in the token response body. An application request is then generated at the client device comprising the cookie and an application request header, the application request header comprising the token payload. The server then regenerates the token by processing the cookie to regenerate the token header and the token signature of the token, and processing the application request header to regenerate the token payload. The token is verified and the application request is processed to generate an application response. The application response is then sent to the client device.

In some embodiments, the token is a JSON web token. The cookie may be a Hypertext Transfer Protocol (HTTP)-only cookie. The cookie may be encrypted when sent and decrypted at the client device. The token payload may be encrypted and may comprise an access token, the token payload being decrypted at the client device.

In some embodiments, the server is a plurality of servers, and generating the token is performed at one of the plurality of servers in response to receiving from the client device an authentication request comprising credentials, the one server verifying the credentials and the token generated as part of stateless processing over the network between the client device and the plurality of servers.

In some embodiments, the method further includes receiving from the client a logout request comprising the cookie and in response, at the server, expiring the cookie to invalidate a stateless session.

Figure 8:
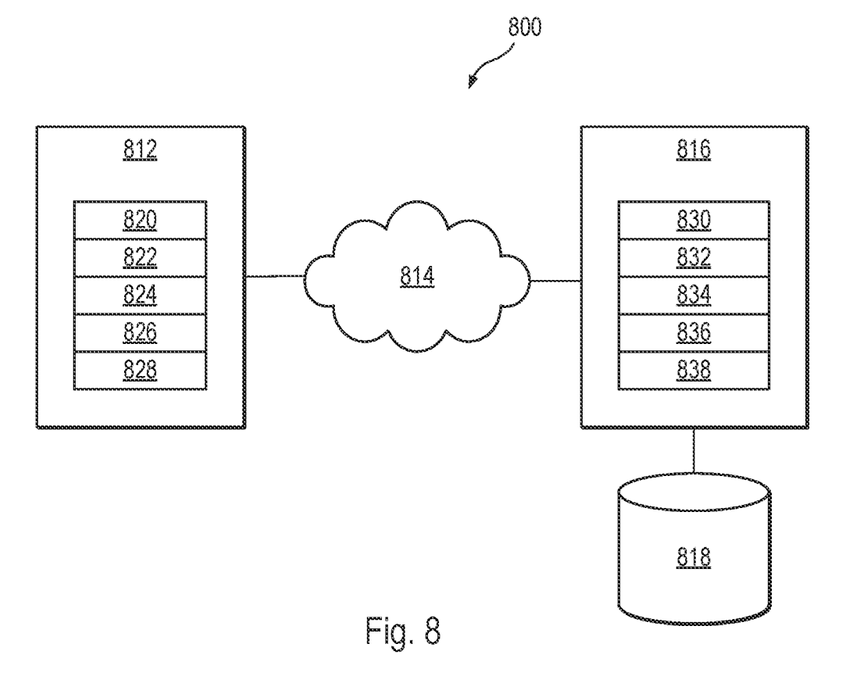
FIG. 8 is a block diagram illustrating a distributed network computing environment in accordance with some embodiments.

FIG. 8 depicts a diagrammatic representation of a distributed network computing environment where embodiments disclosed herein can be implemented. In the example illustrated, network computing environment 800 includes network 814 that can be bi-directionally coupled to designer computer 812 and server computer 816. Network 814 may represent a combination of wired and wireless networks that network computing environment 800 may utilize for various types of network communications known to those skilled in the art.

For the purpose of illustration, a single system is shown for each of computers 812 and 816. However, with each of these computers, a plurality of computers (not shown) may be interconnected to each other over network 814. For example, a plurality of computers 812 (or 816) may be coupled to network 814. Computers 812 may include data processing systems for CCM communication builders (or programmers). Server computer 816 may include data store 818 for storing applications or related data.

Computer 812 can include central processing unit ("CPU") 820, read-only memory ("ROM") 822, random access memory ("RAM") 824, hard drive ("HD") or storage memory 826, and input/output device(s) ("I/O") 828. I/O 828 can include a keyboard, monitor, printer, electronic pointing device (e.g., mouse, trackball, stylus, etc.), or the like. Computer 812 can include a desktop computer, a laptop computer, a personal digital assistant, a cellular phone, or nearly any device capable of communicating over a network. Many other alternative configurations are possible and known to skilled artisans.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 812 and 816 is an example of a data processing system. ROM 822 and 832; RAM 824 and 834; and HD 826 and 836; can include media that can be read by CPU 820 or 830; and can provide output or receive input via I/O 828 or 838. Therefore, these types of memories include non-transitory computer-readable storage media. These memories may be internal or external to computers 812 or 816.

Portions of the methods described herein may be implemented in suitable software code that may reside within ROM 822 or 832; RAM 824 or 834; or HD 826 or 836. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be implemented using any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method for secure stateless communication, the method comprising:
    receiving, at a server, a request from a browser for authentication of user credentials;
    generating, at the server, components of a JSON web token (JWT) including a JWT header, a JWT payload comprising an access token and a JWT signature;
    generating an HTTP-only cookie containing an encrypted version of the JWT header plus JWT signature;
    returning, responsive to the request, a response containing the HTTP-only cookie, wherein the body of the response comprises an encrypted version of the access token;
    for each subsequent communication received by the server from the browser,
        extracting, by the server, the HTTP-only cookie and a request header,
        decrypting, by the server, the HTTP-only cookie to obtain the JWT header plus JWT signature,
        decrypting, by the server, the request header to obtain the access token,
        reconstituting, by the server, the JSON web token from the HTTP-only cookie and the request header including the JWT header, the JWT payload and the JWT signature,
        verifying, by the server, the JWT,
        if the JWT is verified, processing the request and returning a corresponding response to the browser, and
        if the JWT is not verified, denying access to the server and returning a corresponding error message to the browser.

2. The method of claim 1, further comprising extracting, by the server, the encrypted version of the JWT header plus JWT signature from the HTTP-only cookie and decrypting the encrypted version of the JWT header plus JWT signature to obtain the JWT header plus JWT signature.

3. The method of claim 1, further comprising extracting, by the server, the encrypted version of the access token from the header and decrypting the encrypted version of the access token to obtain the JWT payload.

4. The method of claim 1, wherein reconstituting the JSON web token from the HTTP-only cookie and the request header comprises:
    decrypting the HTTP-only cookie and the request header to obtain the JWT header,
    the JWT signature and the JWT payload, wherein the JWT payload comprises the access token, and
    combining the JWT header, the JWT signature and the JWT payload to form the JSON web token.

5. The method of claim 1, wherein a combined size of the JWT header, the JWT signature and the JWT payload is greater than an allowable size of the HTTP-only cookie.

6. The method of claim 1, wherein processing the request comprises extracting authorization information from the JWT payload and enabling access to the server in accordance with the extracted authorization information.

7. The method of claim 1, wherein the request comprises an HTTPS request and wherein the HTTP-only cookie comprises a secure HTTP-only cookie.

8. A method for secure stateless communication over a network, the method comprising:
    transmitting, by a browser on a client device, an authentication request containing user credentials to a server which is coupled to the client device by a network;
    authenticating, by the server, the user credentials;
    generating, by the server in response to authentication of the credentials, components of a JSON web token (JWT) including a JWT header, a JWT payload comprising an access token and a JWT signature;
    generating, by the server, an HTTP-only cookie containing an encrypted version of the JWT header plus JWT signature;
    transmitting, by the server, a response to the request containing the HTTP-only cookie, wherein the body of the response comprises an encrypted version of the access token;
    transmitting, by the browser, one or more subsequent requests to the server, each of the one or more subsequent requests including the HTTP-only cookie and a header containing the encrypted version of the access token;
    processing, by the server, each of the one or more subsequent requests by
        decrypting the HTTP-only cookie and the header to obtain the JWT header, the JWT signature, and the access token,
        reconstituting the JWT,
        verifying the JWT,
        if the JWT is verified, processing the request and returning a corresponding response to the browser, and
        if the JWT is not verified, denying access to the server and returning a corresponding error message to the browser.

9. The method of claim 8, further comprising extracting, by the server, the encrypted version of the JWT header plus JWT signature from the HTTP-only cookie and decrypting the encrypted version of the JWT header plus JWT signature to obtain the JWT header plus JWT signature.

10. The method of claim 8, further comprising extracting, by the server, the encrypted version of the access token from the header and decrypting the encrypted version of the access token to obtain the JWT payload.

11. The method of claim 8, wherein reconstituting the JWT from the HTTP-only cookie and the request header comprises:
    decrypting the HTTP-only cookie and the request header to obtain the JWT header, the JWT signature and the JWT payload, wherein the JWT payload comprises the access token, and
    combining the JWT header, the JWT signature and the JWT payload to form the JWT.

12. The method of claim 8, wherein a combined size of the JWT header, the JWT signature and the JWT payload is greater than an allowable size of the HTTP-only cookie.

13. The method of claim 8, wherein the HTTP-only cookie is inaccessible by Java scripts on the browser.

14. The method of claim 8, wherein processing the request comprises extracting authorization information from the JWT payload and enabling access to the server in accordance with the extracted authorization information.

15. The method of claim 8, in response to receiving a logout request containing the valid JWT, expiring the HTTP-only cookie and returning the expired HTTP-only cookie.

16. A method for secure stateless communication, the method comprising:
    transmitting, by a browser, a request for authentication of user credentials to a server;
    receiving, by the browser, a response to the request for authentication, the response containing components of a JSON web access token (JWT), the response including an HTTP-only cookie and a response body, wherein the HTTP-only cookie contains an encrypted version of a JWT header plus a JWT signature, and wherein the response body contains an access token which is an encrypted version of a JWT payload, wherein a size of the access token in combination with the HTTP-only cookie is greater than an allowable size of the HTTP-only cookie;
    transmitting, by the browser, one or more subsequent requests to the server, each of the one or more subsequent requests including the HTTP-only cookie and a header, wherein the header contains the access token.

17. The method of claim 16, wherein a combined size of the JWT header, the JWT signature and the JWT payload is greater than an allowable size of the HTTP-only cookie.

18. The method of claim 16, wherein the HTTP-only cookie is inaccessible by Java scripts on the browser.

19. The method of claim 16, further comprising:
    transmitting, by the browser after the one or more subsequent requests to the server, a logout request including the HTTP-only cookie and a header; and
    in response to receiving an expired version of the HTTP-only cookie, forgetting the HTTP-only cookie at the browser.

20. The method of claim 19, wherein forgetting the HTTP-only cookie at the browser comprises invalidating the HTTP-only cookie or deleting the HTTP-only cookie from a storage associated with the browser.

* * * * *